United States Patent [19]

van der Lely et al.

[11] Patent Number: 4,776,157
[45] Date of Patent: Oct. 11, 1988

[54] MACHINE FOR WORKING GRASS, HAY OR OTHER CROPS ON THE FIELD

[75] Inventors: Ary van der Lely, Maasland; Cornelis J. G. Bom, Rozenburg, both of Netherlands

[73] Assignee: C. van der Lely, N.V., Naasland, Netherlands

[21] Appl. No.: 903,973

[22] Filed: Sep. 5, 1986

[30] Foreign Application Priority Data

Sep. 5, 1985 [NL] Netherlands .......................... 8502445
Jun. 9, 1986 [NL] Netherlands .......................... 8601486

[51] Int. Cl.⁴ ..................... A01D 78/10; A01D 78/12; A01D 80/02
[52] U.S. Cl. ....................................... 56/377; 56/370; 56/15.4
[58] Field of Search ............... 56/377, 370, 15.1, 15.2, 56/15.4, 192, 341, 189, 190, 341, 344

[56] References Cited

U.S. PATENT DOCUMENTS

| | | | |
|---|---|---|---|
| 3,508,384 | 4/1970 | Madre | 56/15.5 |
| 3,650,098 | 3/1972 | Folk | 56/15.5 |
| 3,757,500 | 9/1973 | Averitt | 56/15.5 |
| 3,896,613 | 7/1975 | van der Lely | 56/377 |
| 3,910,019 | 10/1975 | Schlitter | 56/370 |
| 4,056,923 | 11/1977 | Zweegers | 56/370 |
| 4,330,986 | 5/1982 | van der Lely et al. | 56/377 |
| 4,352,268 | 10/1982 | van der Lely et al. | 56/377 |
| 4,429,517 | 2/1984 | Lohrentz et al. | 56/181 |
| 4,505,096 | 3/1985 | Brown | 56/377 |
| 4,519,190 | 5/1985 | Blakeslee | 56/181 |

FOREIGN PATENT DOCUMENTS

| | | |
|---|---|---|
| 1948960 | 9/1966 | Fed. Rep. of Germany . |
| 1232388 | 1/1967 | Fed. Rep. of Germany . |
| 1507329 | 1/1970 | Fed. Rep. of Germany . |
| 1582291 | 5/1970 | Fed. Rep. of Germany . |
| 2167001 | 5/1977 | Fed. Rep. of Germany . |
| 1582167 | 6/1982 | Fed. Rep. of Germany . |
| 1468829 | 2/1967 | France . |
| 1574280 | 7/1969 | France . |
| 7904916 | 9/1980 | France . |
| 291449 | 6/1965 | Netherlands . |
| 7701572 | 6/1978 | Netherlands . |
| 250278 | 6/1948 | Switzerland . |
| 2061082 | 5/1981 | United Kingdom . |

Primary Examiner—Paul J. Hirsch
Assistant Examiner—Vincent Ciamacco
Attorney, Agent, or Firm—Penrose Lucas Albright; Robert A. Miller

[57] ABSTRACT

The invention relates to a machine for working grass, hay or other crops on the field, provided with two rake members which are drivable about upwardly directed axes of rotation. During operation, the distance between the rake members can be changed by controls at the seat of the tractor on which the machine is mounted to adapt the machine to various circumstances. The machine is provided with swath forming crop guide members, the relative positions of which are automatically adapted to remain about the same irrespective of the distance between the rake members.

10 Claims, 6 Drawing Sheets

MACHINE FOR WORKING GRASS, HAY OR OTHER CROPS ON THE FIELD

BACKGROUND OF THE INVENTION

The invention relates to a machine for working grass, hay or other crops on the field, comprising at least two rake members which are power-driven about upwardly directed axes.

Known machines of this kind for example (DE-B-12 32 388 and DE-C-15 82 167), have a large number of rake members, each of which must be provided with drive means. The rake members each have a small diameter, so that a large number of rake members is necessary for obtaining a reasonable working width. The machines are difficult to adjust to varying circumstances.

It is the object of the invention to improve a machine of the kind referred to above so that the machine can easily be adapted to different conditions of the crop to be worked.

SUMMARY OF THE INVENTION

In accordance with the invention, means are provided for changing the distance between the rake members during working the crop when moving over the field.

In this manner it is possible to achieve that, during working the crop on the field, the machine can be adapted to the distance between the swaths to be worked. Also a large workng width can be obtained using only two rake members. The working width can be changed as desired from the driver's seat of the tractor on fields having non-parallel boundaries, when working crop spread on the field, or in the case of crop lying in non-parallel swaths. For a better understanding of the present invention and to show how it can be carried into effect, reference will now be made, by way of example, to the accompanying drawings, in which:

DESCRIPTION OF THE PREFERRED EMBODIMENTS

Figure 1:
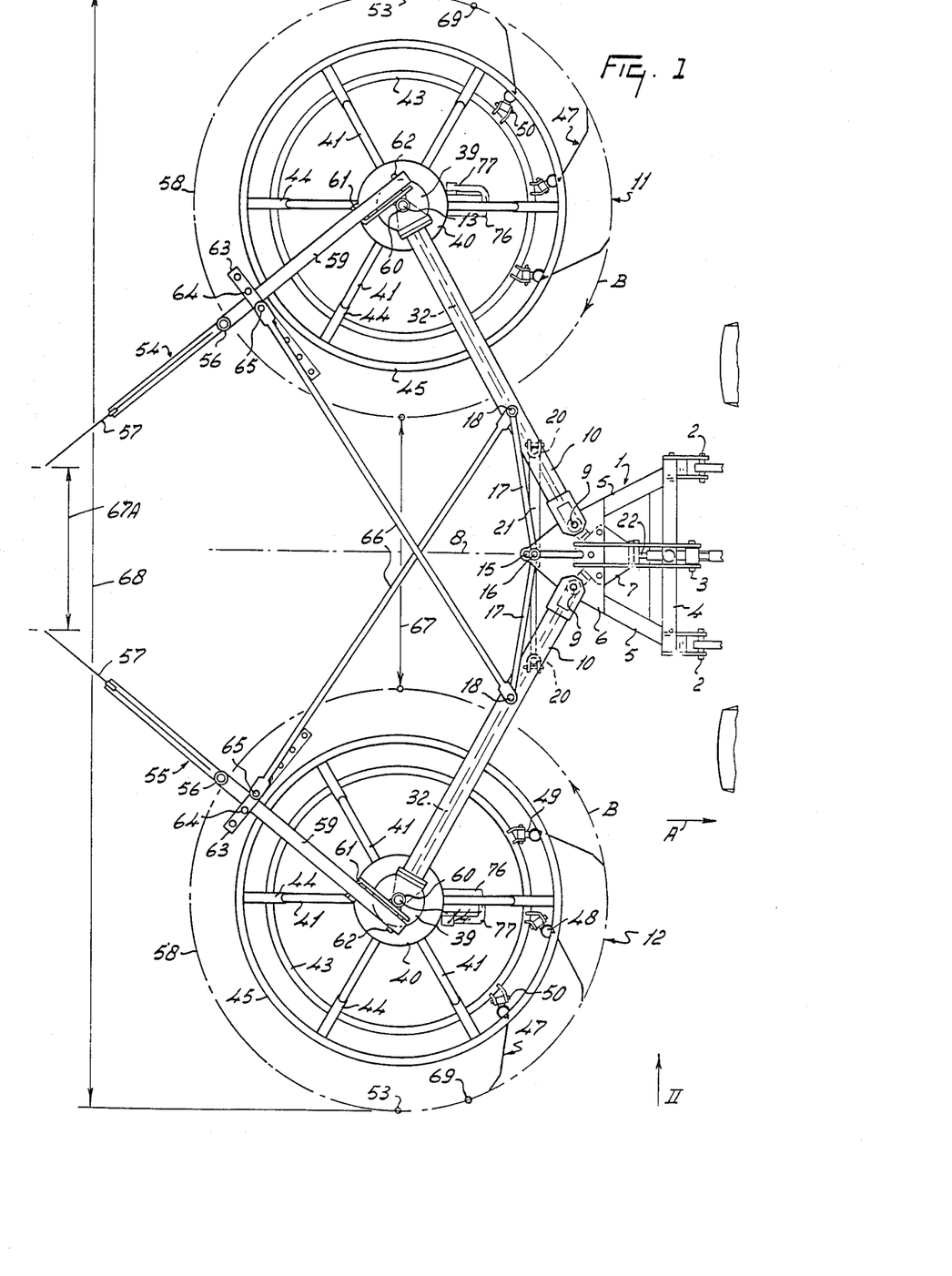
FIG. 1 is a plan view of an embodiment of the machine according to the invention.
Figure 2:
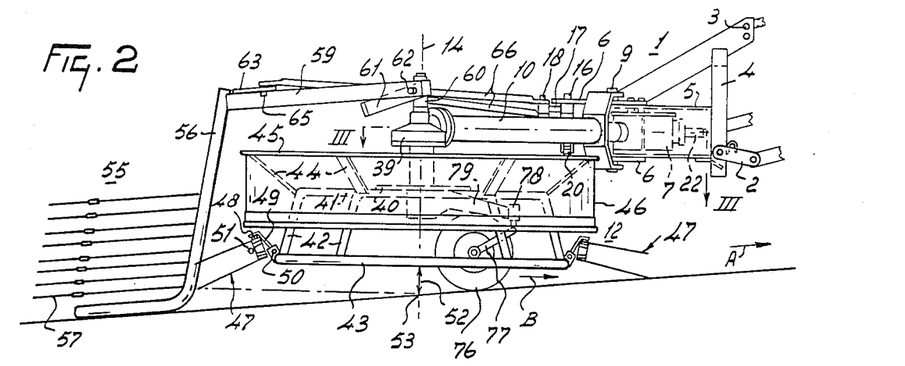
FIG. 2 is a view of the machine according to FIG. 1, taken in the direction of the arrow II in FIG. 1.
Figure 3:
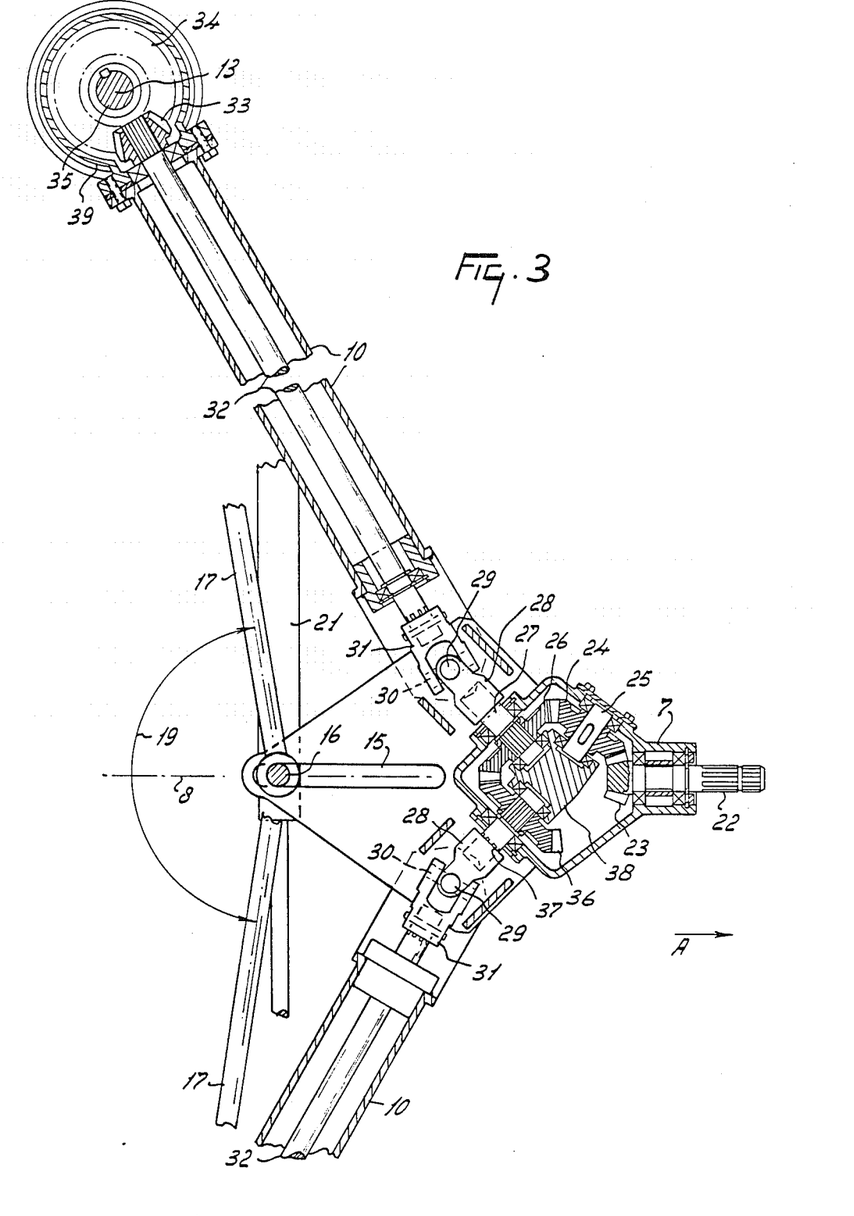
FIG. 3 is a horizontal sectional view taken on the line III—III in FIG. 2.

The machine shown in FIGS. 1–3 according to the invention comprises a frame portion 1 by means of which the machine can be coupled to the three-point lifting arrangement of a tractor. As will be obvious from FIG. 1, the distance of the frame portion 1 measured in the direction of operative travel A is approximately equal to its dimension measured perpendicularly to the direction of operative travel A. The width of the frame portion 1, measured perpendicularly to the direction of operative travel A, slightly exceeds the spacing between the lower lifting arms of a standard, commercially available tractor. This width of the frame portion 1, measured perpendicularly to the direction of operative travel A, is less than or approximately equal to the spacing between the vertical inner sides of the rear wheel tires of such a tractor. At its front end, the frame portion 1 is provided with coupling points 2 for hitching the machine to the lower lifting arms of the tractor and an upper coupling point 3 for connection to the top rod of the lifting arrangement of the tractor. These coupling points 2 and 3 are connected to an upwardly directed trestle 4 which, taken in the direction of operative travel A, may be in the shape of a triangle or of an inverted V. Extending from the two sides of the trestle 4 rearwardly converging carriers 5 are provided which are rigidly interconnected by tie plates 6 near their rearmost ends and their upper and lower sides. In a plan view, the frame portion 1 has approximately the shape of an isosceles or an equilateral triangle. The two interspaced tie plates 6, which are arranged one above the other, enclose a portion of a gear box 7 which is enclosed by the structure of the frame portion 1. The machine has a plane of symmetry indicated by reference numeral 8 which is arranged vertically and extends in the direction of operative travel A, the frame 1 being symmetrical to said plane of symmetry. Upwardly directed pivotal shafts 9 are provided near the rear side of this portion at both sides of the plane of symmetry 8, each being spaced from the plane 8. A respective frame arm 10 is pivotally connected to one of pivotal shafts 9, more specifically in such a manner that the two frame arms are always arranged symmetrically relative to plane 8, as will be explained hereinafter.

At the end of each of the frame arms 10, which is remote from the associated pivotal shaft 9, engine-driven rake members 11 and 12, respectively, are rotatably connected about upwardly directed axes of rotation 13 and 14, respectively. The axes of rotation 13 and 14 are arranged parallel to each other and, taken in the upward direction, are slightly inclined forwardly. The angle between each individual axis of rotation 13 and 14, respectively, and a vertical line is approximately 5°–10° in the operating mode. The centerline of each of the tubular frame arms 10 extends perpendicularly to the associated axis of rotation 13 and 14, respectively, and each pivotal shaft 9 extends substantially parallel to each axis of rotation 13 and 14, respectively.

The rearmost vertex of the frame portion 1, located in the plane of symmetry 8, is constituted by said two interspaced tie plates 6 which are located one above the other. Both tie plates are provided with a straight, slotted hole 15 (FIGS. 1 and 3) the centerlines of which are located in the plane of symmetry 8. In these two interspaced slotted holes 15, arranged one above the other, a pin 16 is slidable, which is arranged parallel to the pivotal shafts 9, for which pin 16 the slotted holes 15 provide a guide means. Two rods 17 are arranged, which are rotatable around this pin in a plane which is approximately perpendicular to the centerline of the pin 16. Those ends of each of these two rods 17 which ends are remote from the pin 16 are pivotally supported in pins 18 which extend parallel to the pin 16. Each pin 18 is individually connected to one of the frame arms 10 and is remote from the pivotal shaft 9 arranged at the same side of the plane of symmetry 8. The spacing between a pin 18 and the associated pivotal shaft 9 is approximately 35% of the spacing between the pivotal shaft 9 and the respective axes of rotation 13 and 14 connected to that same carrier arm 10. The structure is such that, if the pin 16 is located in those ends of the slotted holes 15 which are in the rearmost position (taken in the direction of operative travel A), the centerlines of the two rods enclose, in a plan view, a wide obtuse angle 19 which opens to the rear (FIG. 3), the angle amounting in this embodiment to approximately 160°-170°.

At the bottom side of each frame arm 10, a pin 20 the centerline of which is arranged parallel to the centerline of the pivotal shaft 9 and the pin 18, is disposed in a position located between the centerline of the pin 18 and the centerline of the pivotal shaft 9. The two ends of an adjusting arrangement in the form of a hydraulic cylinder 21 is pivotally supported around the two pins 20. The hydraulic cylinder 21 is a double-acting cylinder and is operable from the driver's seat of the tractor by means of flexible hydraulic connections. The centerline of the hydraulic cylinder is directed perpendicularly to the plane of symmetry 8, and the cylinder 21 is at a lower position than the lower sides of the frame arms 10.

As can be seen from the sectional views of FIG. 3, the gear box 7 has an input shaft 22 having its centerline located substantially in the plane of symmetry 8. The input shaft 22 is connectable to the power take-off shaft of a tractor by means of an intermediate shaft having universal couplings. That end of the input shaft 22 which is located within the gear box 7 is provided with a bevel pinion wheel 23 which is in driving connection with a bevel pinion wheel 24 fitted on a shaft 25 which is rotary-supported in the wall of the gear box 7. The centerline of the shaft 25 encloses an angle of approximately 45° opening forwardly) with the centerline of the input shaft 22. The gear wheel 24 engages a bevel pinion wheel 26 which is disposed on a shaft 27 which is rotary-supported in the housing of the gear box 7. The centerline of the shaft 27 encloses an angle of approximately 90° with the centerline of the shaft 25, the opening of said angle being directed sidewards. One end of the shaft 27 extending outside the gear box 7 comprises a fork 28 which bears a shaft 29, which in the region of its central portion located between the forks is rigidly connected to a shaft 30 which perpendicularly intersects the shaft 29 and is supported by a fork 31, so that the component parts 27-31 constitute a universal coupling. The fork 31 is fitted on a drive shaft 32, the centerline of which coincides with the centerline of the tubular frame arm 10. Near the fork 31 and near its other end, the shaft 32 is rotary-supported in the frame arm 10. That end of the drive shaft 32 which is located near the rake member 11 carries a bevel pinion wheel 33, which extends beyond the frame arm 10 and is in driving connection with a bevel pinion 34 which is rigidly fitted on a drive shaft 35 which has a centerline which coincides with the associated axis of rotation 13.

The bevel pinion wheel 26 is in driving connection with a bevel pinion wheel 36 fitted on a shaft 37 which is coupled to a drive shaft 32 of the rake wheel 12 in a similar manner as the shaft 27 is coupled to the drive shaft 35 of the rake wheel 11. The fork supported by the shaft 37 and the subsequent drive means are consequently given the same reference numerals.

The gear ratio between the input shaft 22 and each of the drive shafts 35 of the rake members 11 and 12 is, at least in the embodiment shown, such that, if the power takeoff shaft of the tractor has a speed of revolution of 540 revs/min, both rake members 11 and 12 rotate at a speed of approximately 110 revs/minute.

The two shafts 27 and 37 together enclose a 90° angle, whose opening faces to the rear and are arranged symmetrically relative to the plane of symmetry 8. The facing ends of the shaft 25, 27 and 37 are journalled in a supporting member 38 which is rigidly fitted relative to the housing of the gear box 7.

Each of the rake members 11 and 12 is of the following structure (FIGS. 1, 2).

The driven bevel pinion wheel 34 is supported in a gear box 39 which is rigidly connected to the contiguous frame arm 10. The drive shaft 35 of the rake member is rigidly connected to a plate-shaped hub 40 having radially extending spokes 41 which are, remote from the hub 40, folded downwards in the shape of end pieces 42. The lowermost ends of the end pieces 42 of the spokes 41 carry a circular, endless rim 43 in the form of a pipe. The rim 43 is parallel to a plane which is perpendicular to the axis of rotation 13 and 14, respectively (FIGS. 1 and 2).

Near the upper ends of the end pieces 42 a carrier 44 is fitted to each spoke 41, which carrier is positioned obliquely upwardly and outwardly. At their upper sides, the carriers 44 have a second rim 45 which is located coaxially around the respective centerlines 13 and 14, as is also the rim 43, and planes containing rims 43 and 45 are also, of course, perpendicular to these centerlines. The diameter of the second rim 45 is approximately 20% larger than that of the rim 43.

A flexible wall 46, made of plastic cloth, such as plastified canvas, is fastened to the second rim 45. The wall 46 is located coaxially around the axes of rotation 13 and 14, respectively and, at least during operation, is cylindrical since the material is in a taut condition by centrifugal forces due to the rotation of the rake member. The wall 46 extends downwardly from the second rim 45 and, in a side view in accordance with FIG. 2, terminates at a distance above the rim 43 which is approximately 10% of the diameter of the rim 43. It will be obvious that the diameter of the wall 46 approximately corresponds to that of the second rim 45 and consequently exceeds the diameter of the rim 43.

A number of groups of tines 47, in this embodiment ten groups, are provided in the circumference of the rim 43 of each rake member 11, 12, in a uniformly distributed way, each group being formed by two spring steel tines which are located one above the other and are interconnected by groups of coils. Within these groups of coils of each group of tines 47, a sleeve 48 is located which extends above the upper side of the groups of coils and is, in this region, rigidly connected to a carrier 49 which, in a direction from the upper side of the sleeve 48, initially extends inwardly in the direction of the rotary shaft of the rake wheel and is thereafter folded downwards to a rotary shaft 50, around which the tine carrier 49 is freely rotatable together with the group of tines 47 (FIG. 2). The pivotal shaft 50, which supports the tine carrier 49, is directed approximately tangentially relative to the ring 43 but may alternatively be directed somewhat outwardly, with respect to the direction B of the rake member, relative to a local tangential line at the rim 43 (FIG. 1).

In an operative position of the tine group, the center of gravity of the group of tines 47, the sleeve 48 and the tine carrier 49 is denoted in FIG. 2 by the reference numeral 51. As the center of gravity 51 is nearer to the upper tine than to the lower tine of the group of tines 47, the group of tines adjusts itself, during operation, not only in outward direction but also downwardly so that the tip of the lower tine is located at a distance below the plane through the lower side of the rim 43 approximately equal to the spacing 52 (FIG. 2) between said last plane and the ground when the tine group passes a plane that extends through both axes of rotation 13 and, 14. During rotation of the rake member, the tip of the lower tine of the group of tines 47 consequently contacts the soil or the stubbles on the field approximately at the point 53 and, during its further motion in the forward direction B, is forced upwardly by the soil so that the tine is firmly in contact with the soil through substantially the entire leading half circumference of its path and bears onto the ground with some force, whereby the center of gravity 51, relative to a plane which is directed perpendicularly to the axes of rotation 13 and 14, respectively and passing through the pivotal axis 50, is urged to a position above this plane. This provides the significant advantage that the working width of a rake member is substantially equal to the diameter of the path described by the tine tips. The invention is, however, not limited to this tine construction but also relates to tine constructions in which the tip of the lowermost tine is in contact with the soil for only a part of the leading half of the path described by the tine tip and the rear boundaries of the region by ground contact are consequently located at some distance forward of a plane through the axes of rotation 13 and 14.

The machine includes two crop guide members in the form of the swath boards 54 and 55, which are always arranged symmetrically relative to the plane of symmetry 8. Each of the swath boards 54 and 55 are applied to this embodiment is of a construction which is known per se, comprising a downwardly directed and thereafter rearwardly directed pipe or rod 56, the rearwardly directed portion sliding over the ground during operation. Spring steel rods 57, which extend freely in rearward direction and define a crop guide member, are fitted to the upwardly extending portion of the pipe 56. The front sides of each of the respective swath boards 54 and 55 are located at a short distance behind the path described by the tips of the tines of the tine groups 47, the swath board, as seen in a direction opposite to the direction of operative travel A, being located at least partly behind the path 58 described by the tines. The swath boards 54 and 55 are rigidly connected to carriers 59 which, from the upper end of the associated pipe, bridge the radius of the respective rake member, and are pivotally connected to the associated gear box 39. To that end a sleeve 60 is arranged on the gear box 39, which sleeve is capable of pivoting around the respective shaft 35. A carrier means 61 (FIG. 1) is rigidly connected to the respective sleeve 60.

The carrier means 61 accommodates a pin 62 which extends perpendicularly to the axes of rotation 13 and 14, respectively and is directed obliquely rearwardly and outwardly, the carrier 59 being provided capable of free rotation around this pin 62. Consequently, each carrier 59 is capable of rotating freely around both the approximately horizontally extending pin 62 and around the respective axes of rotation 13 and 14. Because of the free rotation around the pin 62, the swath board can adapt itself to soil unevennesses in the vertical direction. The swath boards are provided detachably to the remainder of the machine.

In a location between the pin 62 and the connection of each swath board to the pipe 56, but near the connection to the pipe 56, an approximately horizontal adjusting plate 63 is provided on the upper side of each of the two carriers 59 in a direction perpendicular to the longitudinal direction of the carrier. The plate or strip 63 has a number of holes 64 (at least three holes in this embodiment), distributed along its length. A pin 65, which is connected to a steering rod 66, is passed through one of the holes 64. That end of the steering rod 66 remote from the carrier 59 is connected pivotally to the pin 18 which is associated with that frame arm 10 which does not support the swath board arm combination 54, 59 and 55, 59, respectively considered. This implies that, in the plan view as shown in FIG. 1, the steering rods 66 normally intersect near a point in the plane of symmetry 8. The dimensioning of the above-described pivotal construction (that means, the distance between the respective axes of rotation 13 or 14 and the adjacent pin 65, the distance between the pin 65 and the pin 18 located on the other arm 10, the distance between said pin 18 and the adjacent pivotal shaft 9, the distance between the two pivotal shafts 9 and the distance between the pivotal shaft 9 and the respective axes of rotation 13 and 14) have been selected as that on readjustment of the angle between the centerlines of the frame arms 10, the lateral distance 67A between the rear ends of the swath boards 54 and 55 remains substantially constant. The last-described construction provides a steering arrangement for the swath boards when the rake members are readjusted relative to each other.

If the angle, which openings to the rear, between the centerlines of the frame arms 10, and which, as shown in the embodiment, is approximately 120°–125°, becomes smaller, the swath boards 54 and 55 then converge to a lesser extent in the rearward direction and vice versa. The lateral distance 67A is thus preserved and determines the width of the swath to be deposited by the machine.

The embodiment shown includes two rake members which (see FIG. 1) are driven in opposite rotational sense B from the power take-off shaft of the tractor (see FIG. 3) via the input shaft 22, the gear wheels 23, 24, 26 and 36, and via the drive shafts 32 and the gear wheels 33 and 34.

As will be obvious from FIG. 1, there is a spacing 67 between the rake members 11 and 12 which determines the width of a strip of ground which is not directly worked by the rake members. The spacing 67 is determined by the shortest distance between the tine paths 58, described by the tips of the outermost tines, of the rake members 11 and 12.

For this embodiment the working width of the machine is determined by the distance between the points 53 (FIG. 1), this distance being indicated by reference numeral 68 in FIG. 1. If, however, the rake members are provided with tine groups which, at the outer sides of the rake members 11 and 12 and rotating in the direction B, contact the soil or the stubbles in points 69 which are located before the plane through the axes of rotation 13 and 14, the working width is then determined by the lateral distance between these points 69, shown in FIG. 1.

The distance 67 between the two rake members 11 and 12 is, according to an aspect of the invention, at least 20% of the working width 68 or the working width between the points 69 if applicable. In the embodiment shown, the distance 67 is approximately 25% of the working width at a tine path diameter of 1.95 of each rake member and a distance 67 of 1.25 meters. This percentage may alternatively be higher. If, for example, the distance 67 is two meters, and each rake member 11 and 12, respectively, has a diameter of 2.50 meters, then the working width is seven meters and said percentage is 28.5%.

The distance 67 may exceed the tine path diameter of one of the rake members. For a spacing of two meters and a tine path diameter of each rake member of, for example, 1.9 meters, said percentage is approximately 35%.

During operation, the rake members are driven in tha above-described manner in the opposite rotary senses B, the outwardly extending tine group 47 which, in a plan view, is directed somewhat to the rear relative to the rotary sense B, moves the crop in the direction of the strip of ground, whose width of which corresponds to the distance 67. This applies to the crop which is spread over the field and has to be tedded or raked together. For tine groups of a different type, the tines first contact the crop at points 69. The conception of "working width" of the machine is determined by the points where the tines contact the ground of stubbles and does not necessarily depend on the location where the tines touch the crop for the first time during a revolution. Said last points may be located more inwardly, such as in the case of swaths to be combined by the machine, lying in the field straight before the rake member.

Since the rake members are in a rather flat position and the tines extend rearwardly relative to the rotational sense B, a portion of the crop lifted up by the tines will, depending on the shape and direction of the tines, be discharged from the tines already in an earlier stage near the front sides of the tine paths, and be thrown in the direction of the plane of symmetry 8. The remaining portion of the crop, displaced by the tines, is subsequently also thrown inwardly towards the plane of symmetry 8, but further to the rear in said direction, all the thrown crop flying approximately parallel to the ground always hits the crop lying on the strip of ground of a width equal to the distance 67. Such crop is forcely and thoroughly mixed thereby and, also on account of the outwardly disposition of the tines.

Consequently, the crop lying on the strip of ground defined by the distance 67 is worked by the rake members 11 and 12, not directly but indirectly. The crop thus gathered is collected by the swath boards 54 and 55 in a strip of ground the width of which is substantially equal to the distance 67A and the crop being deposited in a single swath. When the crop lies already on the ground in the form of swaths lying in front of rake members 11 and 12, these swaths are raked together on the strip of ground of a width equal to the distance 67, and are further formed into a single combined by the swath boards.

Using the machine in accordance with the invention, it is possible to adapt the working width of the machine to the circumstances, for example to the center-to-center distance between swaths already present on the field, and also, for example, relative to the boundaries of the worked part of the field, as will be further explained hereinafter. With the machine in accordance with the invention, it is further possible to ted crop when the swath boards are omitted, possibly after adaptation of the tine positions.

In accordance with the invention, the working width of the machine can be changed by operating the hydraulic cylinder 21 from the driver's seat on the tractor, because of which the rearwardly facing open angle between the center lines of the frame arms 10 is increased or reduced. During this readjustment, the rods 17 which (since the whole, overall machine is of a symmetrical structure with respect to the plane 8) are of equal length, automatically cause the two frame arms 10 to move symmetrically relative to the plane B in response to the fact that the pin 16 moves in the two slotted holes 15 which are located one above the other and have their centerlines located in plane 8. Alternatively, the hydraulic cylinder may be replaced by a screw spindle. But this is less desirable in that either the driver must leave his seat for this readjustment, or remotely controlled means for turning the spindle is required thus substantially increasing the cost of this structure. By readjusting the frame arms it is possible to adjust, during operation, the rake members to at least two, and even to an infinite number of relative positions. The end positions of the frame arms are determined by where the ends of the slotted holes 15 are located. On changing of the angle between the frame arms 10 during operation the relevant pivotal construction formed by the frame arms 10, the carriers 59 and the rods 66 causes the distance 67A between the rearmost ends of the swath boards to remain substantially the same.

It should be noted that the distance 67A itself is adjustable. If the two pins 65 are symmetrically inserted in another hole of the setting strips 64, thus changing the operative length of the rods 66, the distance 67A can be increased or reduced. Once a lateral distance 67A has been selected, this width automatically remains substantially constant on readjustment of the angle between the adjusting arms 10. The feature of changing the width of the lateral spacing 67A provided by the setting plates 63 renders it possible for the user of the machine to adapt the swath width to a subsequent machine such as a loading wagon, a high-density baler, a round baler etc., having pick-ups of a nominal width which, depending on the make, may approximately vary between 1.40 meters and 1.90 meters; the width of the swath to be deposited by the present machine should be slightly less than the nominal width of the pick-ups of the subsequent machines; otherwise chance that crop may not be completely picked up, are great.

If the two pins 65 are inserted asymmetrically into the rows of holes 64 of the setting plates, the swath boards are arranged asymmetrically relative to the remaining portion of the machine. Using such an arrangement, the swath can be deposited at a larger distance from, for example, a ditch edge so that it is not necessary for a subsequent machine to drive as closely as it might otherwise along the ditch edge.

Figure 5:
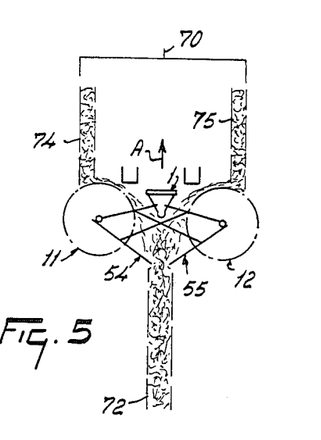
FIG. 5 is a plan view of a method of using the machine according to the invention, which method may be a continuation of that of FIG. 4.
Figure 6:
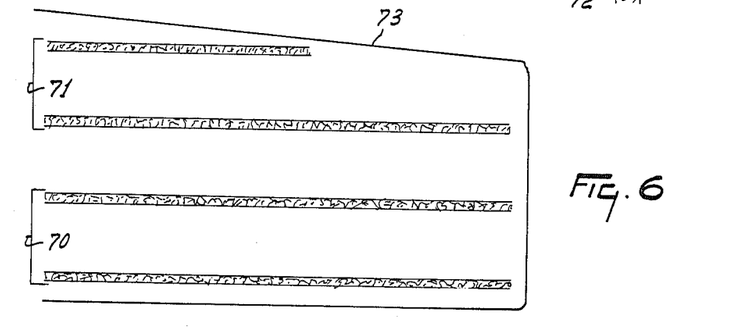
FIG. 6 is a plan view of a border strip of a piece of land with swaths lying in the field and for which the machine can be used to advantage.

In accordance with a further feature of the invention, the working width of the machine can be readjusted during operation, that is during travel over the field (however, also such adjustment is also possible while the machine is resting on the ground or while in a lifted position when attached to the three-point lifting device of a tractor). The need for this feature may arise where there are tapering field boundaries as shown in FIG. 6. The swaths lying on the field are denoted pairwise by reference numerals 70 and 71, respectively. In the manner as shown in FIG. 5, the swaths 70 can be combined to one wide swath 72; this is a normal swath treatment. Thereafter swath 72 can be lifted up by one of the machines mentioned above. The plot of ground shown in FIG. 6 has, however, a boundary 73, for example a fence or ditch which, with to the opposite main boundary, enclose an acute angle. One of the two swaths 71, the swath being located most closely to the boundary 73, is however of necessity shorter than the other swath. If now the machine picks-up the two swaths 71 (in FIG. 6 from left to right) the normal procedure as shown in FIG. 5 can originally be followed, but if the boundary 73 approaches to near relative to the side of the tractor, the driver can reduce, during driving, the distance between the rake members 11 and 12 by operating the hydraulic cylinder 21, so that the end of swath 71 nearest boundary 73 is worked up, when reached, as illustrated in FIG. 5. To reach this swath 71, whereas in the meantime the tractor's direction of travel is adapted to be nearly parallel to the boundary 73 in a manner so that the tractor wheels do not come too near to the boundary, for example a ditch edge. Such an adjustment of the arms 10 during travelling over the field can, of course, also be applied if the swath 71 lying near the field edge, lies parallel thereto and, therefore, is disposed at an angle with the other swaths. This also applies to crop spread over the field. In general it can be stated that, during operation, the working width can be adapted due to the local circumstances of the dispositions of the field or the crop or both.

Figure 4:
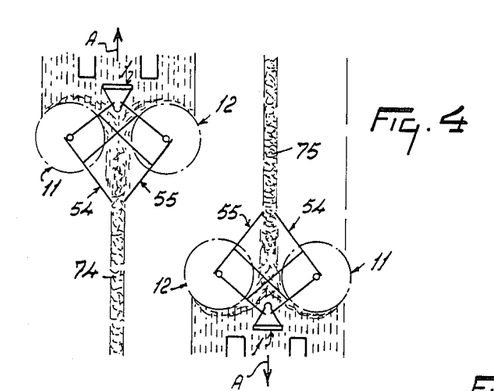
FIG. 4 is a plan view of a method of operating the machine on the field.

Starting from mown crop spread over the field, the machine combines this crop to a swath 74 during travel in one direction (FIG. 4), the machine being, for example, adjusted to its widest working width. If the machine consecutively drives back along the strip of ground adjacent the strip which has already been worked, this contiguous strip of soil is worked in the same manner, which results in a swath 75. During a subsequent trip of the machine (FIG. 5) the distance 67 between the two rake members 11 and 12 is adapted such that the swath 74 and 75 already formed are, for example, directly in front of the rake members; these swaths are then worked in the most advantageous manner and combined to a larger loading swath 72, to be picked up by a subsequent machine.

The machine according to the invention renders it possible to provide a raking machine having a very wide width (for example seven meters) and having only two rake members. If, in the beginning, the crop is spread over the field, the crop lying on the strip of ground equal to the width of the distance 67 will thoroughly be stirred by the quantity of crop thrown laterally into this strip of crop, by the rake members, and after that, possibly be deposited in a swath with the aid of the swath boards or, if there are no operative swath boards, be tedded; this feature is of particular importance in regions where very large surface areas must be worked in a shortest possible period of time. Consequently, the machine according to the invention then provides a very large capacity using only two rake members, combined with a very simple operation of the rake member setting and swath board setting. If so desired, the working width can be varied during travel over the field.

The machine according to the invention has, in spite of the wide working width which is obtainable, a good stability relative to the tractor. The optionally adjusted rake members 11 and 12 are fixed relative to each other during operation by the hydraulically blocked hydraulic cylinder 21 (apart from the readjustments in said working width which can be made during operation), the rods 17 determining the position of the rake members relative to the plane of symmetry 8 by means of the pin 16 accommodated in the slotted holes 15.

Each of the two rake members 11 and 12 is supported by a ground wheel 76. A carrier 77 which is directed forwardly and upwardly from the axle of the ground wheel 76, is provided, being freely pivotable by means of a hinge 78 disposed approximately parallel to the axes 13, 14 and connected to a support 79 which is rigidly connected to a hub portion located inside the hub and which portion is rigidly disposed with respect to the gear box 39. The support 79 extends from this hub portion parallel to the direction A in forward direction. Consequently, each ground wheel 76 is located at a distance forward an extension of its respective rotary axis 13, or 14, and acts as a swiveling wheel. As the entire machine is hitched to the three-point lifting device of the tractor; the swiveling wheels 76 follow all the steering motions of the tractor without exercising lateral forces on the machine. This ground wheel arrangement is of great advantage if the distance between the rake members is readjusted during travel of the machine, as the directions of these ground wheels then automatically adapt the readjustments.

Figure 7:
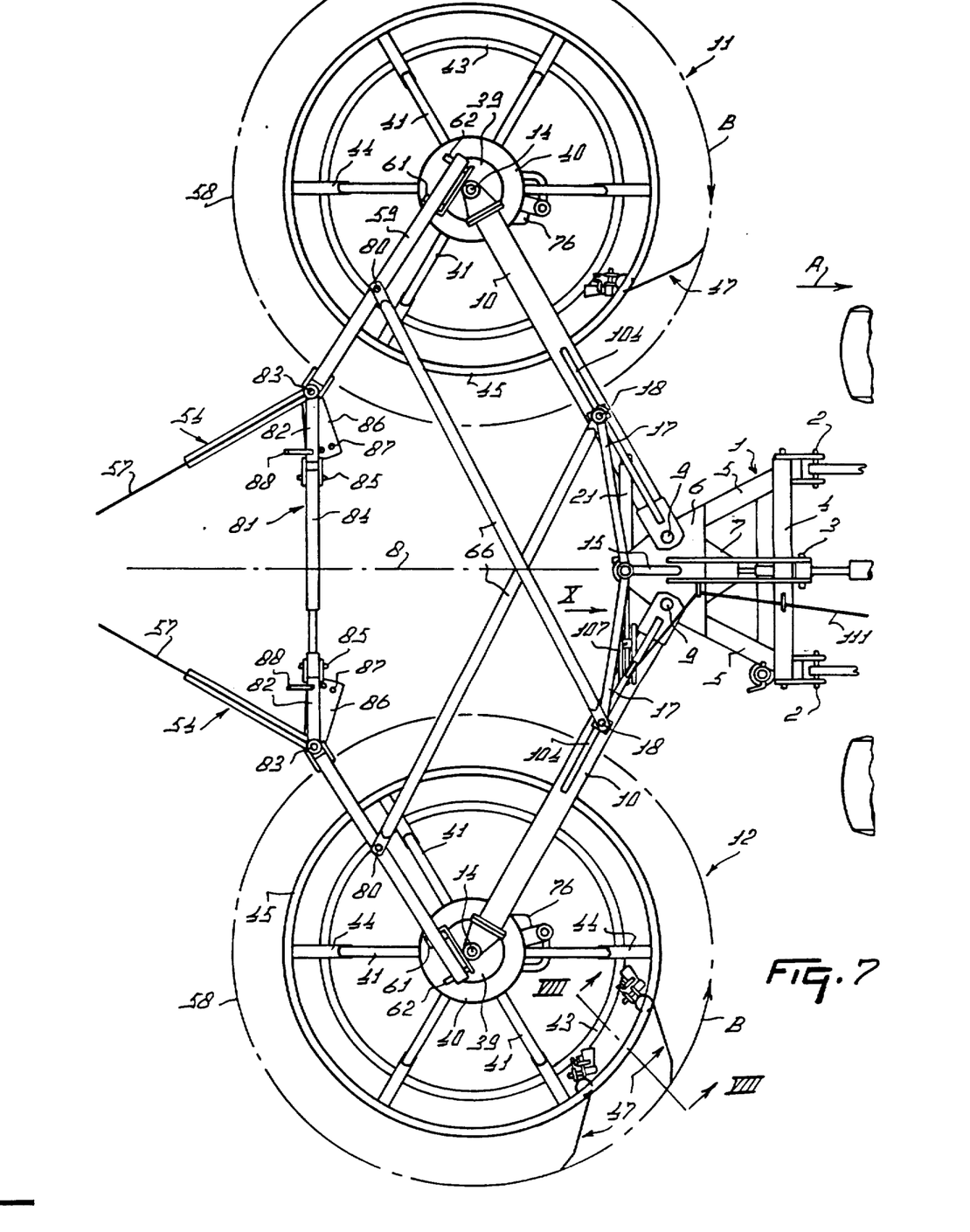
FIG. 7 is a plan view of a modified embodiment of the machine according to the invention.

FIG. 7 shows a plan view of a machine which, relative to the machine previously described, has some modification (FIGS. 7 to 11). The machine parts and compositions not described in this embodiment correspond to those described in the preceding embodiment and are referred to by the same reference numerals.

In the embodiment according to FIG. 7, the two adjusting plates 63 (FIG. 1) have been omitted, the relevant ends of the two steering rods 66 being directly pivotally connected to the adjacent ends of the carriers 59 about pivotal shafts 80 (FIG. 7). Consequently, during adjustment of the working width 68, the carriers 59 are steered relative to the pertinent frame arms 10 by polygon pivotal constructions 6, 10, 59, 66, 59, 10, providing a steering arrangement. As in the previous embodiment, these two pivotal constructions are designed symmetrically relative to the plane of symmetry 8.

Between the rear ends of the two carriers 59 there is arranged a steering device in the form of a connection beam 81, the direction of which, seen in plan view according to FIG. 7, is directed constantly perpendicularly to that of the plane of symmetry 8 because of the continuously symmetrical arrangement of the machine relative to said plane of symmetry. Near its two ends, the connection beam 81 comprises a short carrier beam 82 which is pivotally connected to the rear end of the adjacent carrier 59 by means of an upwardly directed pivot 83, the direction of said pivot 83 being fixed with respect to the adjacent carrier 59. The two facing ends of the carrier beams 82 are interconnected by a substantially horizontal member 84, the length of which can be changed. In the present embodiment, the member 84 is realized as two telescopically slidable tubes. The length of the connection beam 81 adjusts itself automatically in dependence on the angle between the two frame arms 10. By means of horizontal pivotal shafts 85 directed in the direction of operative travel A, the member 84 is pivotally connected to both carrier beams 82 which, as seen in horizontal direction, include a fixed angle of approximately 90° with the adjacent pivot 83. The pivotal shafts 85 are desirable because the carriers 59 are pivotable relative to the arms 10 about the pins 62 in dependence on the movement of the swath boards 54 over the uneven ground.

To the front ends of each of the swath boards 54 there is arranged in a rigid manner an adjusting plate 86 comprising adjusting holes 87 that are equidistant from the pivots 83. By means of a locking pin 88 passing through the carrier beam 82, the adjusting plates can be adjusted in various positions relative to the adjacent carrier beam 82. As a result of the fact that the adjusting plates 86 are adjustable and lockable in various positions relative to the adjacent carrier beam 82 and the connection beam 81, the adjacent swath board is also adjustable and lockable relative to the plane of symmetry 8. In this manner it can be achieved that the angle between each of the swath boards 54 and the plane of symmetry 8, seen in plan view according to FIG. 7, always remains constant upon mutual adjustment of the arms 10. Thus, it is prevented that, upon adjustment of the arms 10, the said angle becomes so great that a danger of clogging of the crop moving through between the swath boards would arise. Equally, it is possible for a person operating the machine to adjust the angle between the swath boards and the plane of symmetry 8 (this angle being invariable during operation) as required, e.g. depending on the nature of the crop.

Figure 8:
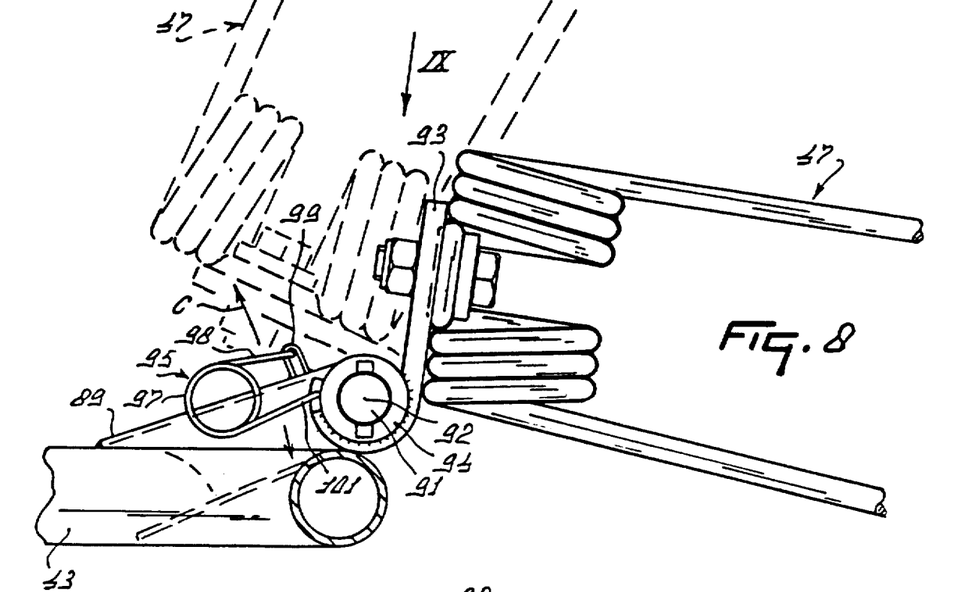
FIG. 8 is a cross-section and a view according to the lines VIII—VIII in FIG. 7.
Figure 9:
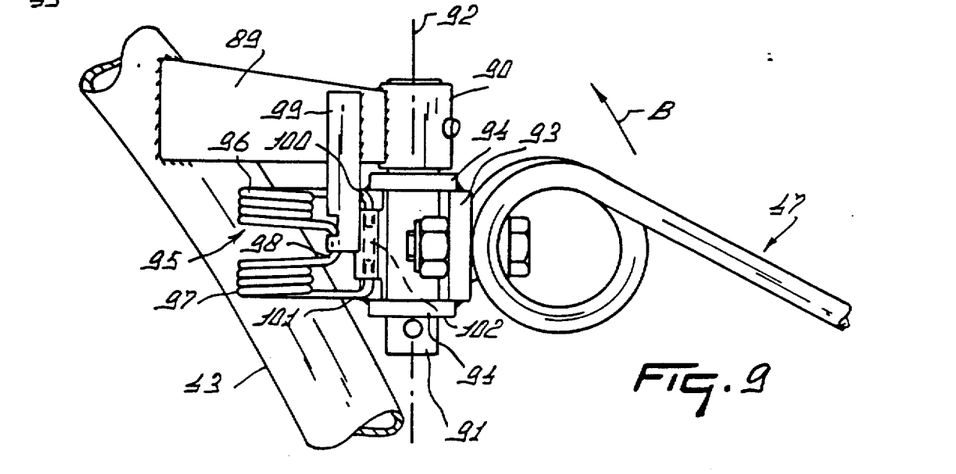
FIG. 9 is a plan view according to arrow IX in FIG. 8.

FIGS. 8 and 9 show the construction of the groups of tines applied in the embodiment according to FIG. 7. Near each group of tines 47 there is arranged an outwardly and slightly upwardly directed support 89 at the upper side of the rim 43, which support at its end disposed near the outside of the circumference of the rim is rigidly connected to a sleeve 90 (FIG. 9). The sleeve 90 accommodates a shaft 91 which, with respect to the rotational direction B of the relevant rake member, projects in rearward direction from the sleeve. The centerline 92 of the sleeve 90 and the shaft 91 is located approximately parallel to a plane directed parallel to the circular rim 43. With respect to the rotational direction B, the centerline 92 includes a forwardly opened angle of approximately 25°-30° with a tangent at the rim 43 applied near the rear side of the shaft 91. FIGS. 8 and 9 show the group of tines 47 in its operative position. The group of tines 47 is attached to a plate-shaped tine carrier 93 which, in the operative position, is, from the shaft 91, upwardly directed and which at its bottom side is bent inwardly and subsequently again upwardly. Near this bent portion, the carrier 93 is welded to two rings 94 lying on either side of the tine carrier 93, which rings are fittingly turnable about the shaft 91 which is fixed relative to the sleeve 90. The aforementioned bent bottom portion of the tine carrier 93 is welded onto the rings 94 in such a manner that its inner face directed towards the shaft 91 has a clearance, relative to the outer surface of the shaft 91, of at least approximately one-half to one multimeter in radial direction and all around, preventing that, after lengthy operation of the machine, the tine carrier could not, or could only with difficulty, swivel about the shaft 91 due to adhering dirt and rust.

To the group of tines is added a spring 95 comprising two sets of inerspaced spring coils 96 and 97, which both are wound about the same, approximately horizontal, centerline. The wire material of the sets of spring coils 96 and 97 continues between the coils in the form of an intermediate portion 98 located near the upper side of the spring 95, which intermediate portion points in outward direction. At its outer side, i.e. spaced from the center line of the spring coils, portion 98 is hooked onto a carrier 99 attached to the support 89 and projecting therefrom to the rear rotational direction B. Therefore, the spring 95 is situated behind the support 89 as a protection against adhering crop. The, in rotational direction, foremost and rearmost coils of the sets 96 and 97 continue at the bottom side of the coils in the form of hooks 100 and 101, which are also directed outwardly from the coils 96 and 97 and, at their free ends, are fitted into a horizontal bore 102 arranged in that free end of the bent portion of the tine carrier 93 which is closest to spring 95.

In the operative position of the machine as shown in FIG. 8, wherein the tines of the group of tines 47 are directed outwardly and obliquely downwardly, the pre-tension of the spring 95 tends to urge hooks 100 and 101 relative to the intermediate portion 98 away from each other according to the two arrows C. In the operative position, this is prevented by the fact that the centrifugal force acting on the group of tines and the tine carrier counteracts the pre-tension of the spring 95. In case the number of revolutions of the relevant rake member decreases, the spring 95 relaxes and the hooks 100 and 101 in the direction of the lower arrow C relative to the intermediate portion 98 retained by the carrier 99, as a result of which the tine carrier 93 together with the two rings 94 turns in counterclockwise direction as seen in FIG. 8 about the centerline 92, so that the group of tines 47 is raised from its operative position into a transport or inoperative position, the tines being brought into an approximately vertical transport position (indicated by dotted lines in FIG. 8), in which they rest against the outer side of the flexible wall 46. In downward direction, the operative position of the groups of tines 47 can be limited by a non-indicated stop.

Figure 10:
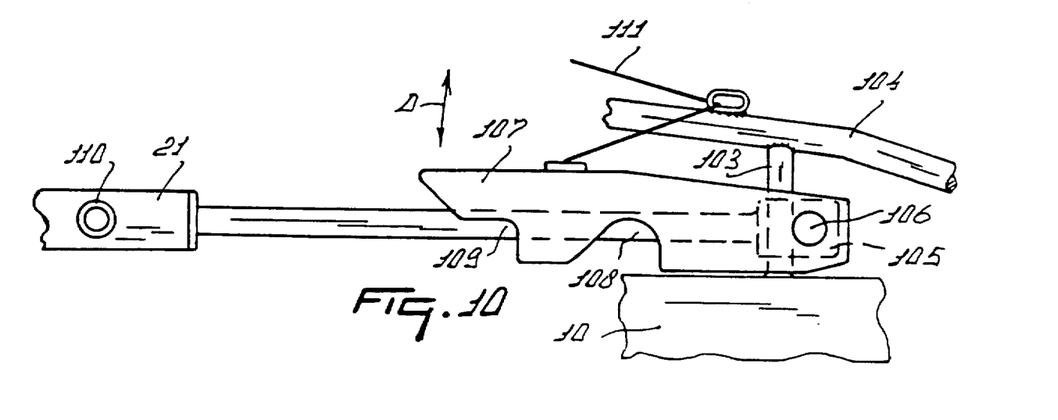
FIG. 10 is a view according to arrow X in FIG. 7.

In order to prevent that rotating rake members having outwardly directed tines are moved towards each other by means of operating of the hydraulic cylinder 21 up to such a small interspace that damage could arise, structure according to FIG. 10 can be provided. In this embodiment, the hydraulic cylinder 21 is arranged above the upper sides of the frame arms 10. The end of the piston rod of the cylinder 21 is turnable about an upright pin 103 located parallel to the pivotal shafts 9, which pin at its top side is supported by a support 104 which, on either side of the pin 103, is directed downwardly and is at its ends welded onto the frame arm 10. A fork 105, which is fitted on the end of the piston rod of the cylinder 21 and by means of which the piston rod is turnable about the pin 103, also comprises a pivotal shaft 106 perpendicularly crossing the pin 103, both ends of pin 103 projecting outside said fork. Around the ends of the pivotal shaft 106 a plate-shaped locking device 107 is arranged being pivotable in the directions according to the arrows D. In its lowermost operative position, shown in FIG. 10, the locking device 107 rests with its bottom side partly on the top side of a frame arm 10, which constitutes a downward stop. During operation, the locking device is kept in this position due to its weight. The locking device 107 is provided with a recess 108 arranged in its lower boundary and spaced from the two ends thereof. The locking device 107 has a second recess 109 arranged in the upward boundary thereof facing the cylinder 21. Near its end facing the locking device 107, the hydraulic cylinder 21 comprises at its side a metal sleeve 110 which projects in horizontal direction, which can also serve as a nipple for one of the hydraulic connections of the cylinder 21. The position of the locking device 107 shown in FIG. 10 is used for the operating positions of the machine. The distance from the recess 109 relative to the pin 103 is selected so that, if the piston rod is retracted and both rake members move in the direction of the plane of symmetry 8 and whereby ultimately the sleeve 110 must come to a halt in the recess 109 forming a stop co-operating with said sleeve, the distance between the rotating rake members is such that they cannot damage each other; in this position, for example, the paths traced by the tine tips do not yet overlap each other.

Figure 11:
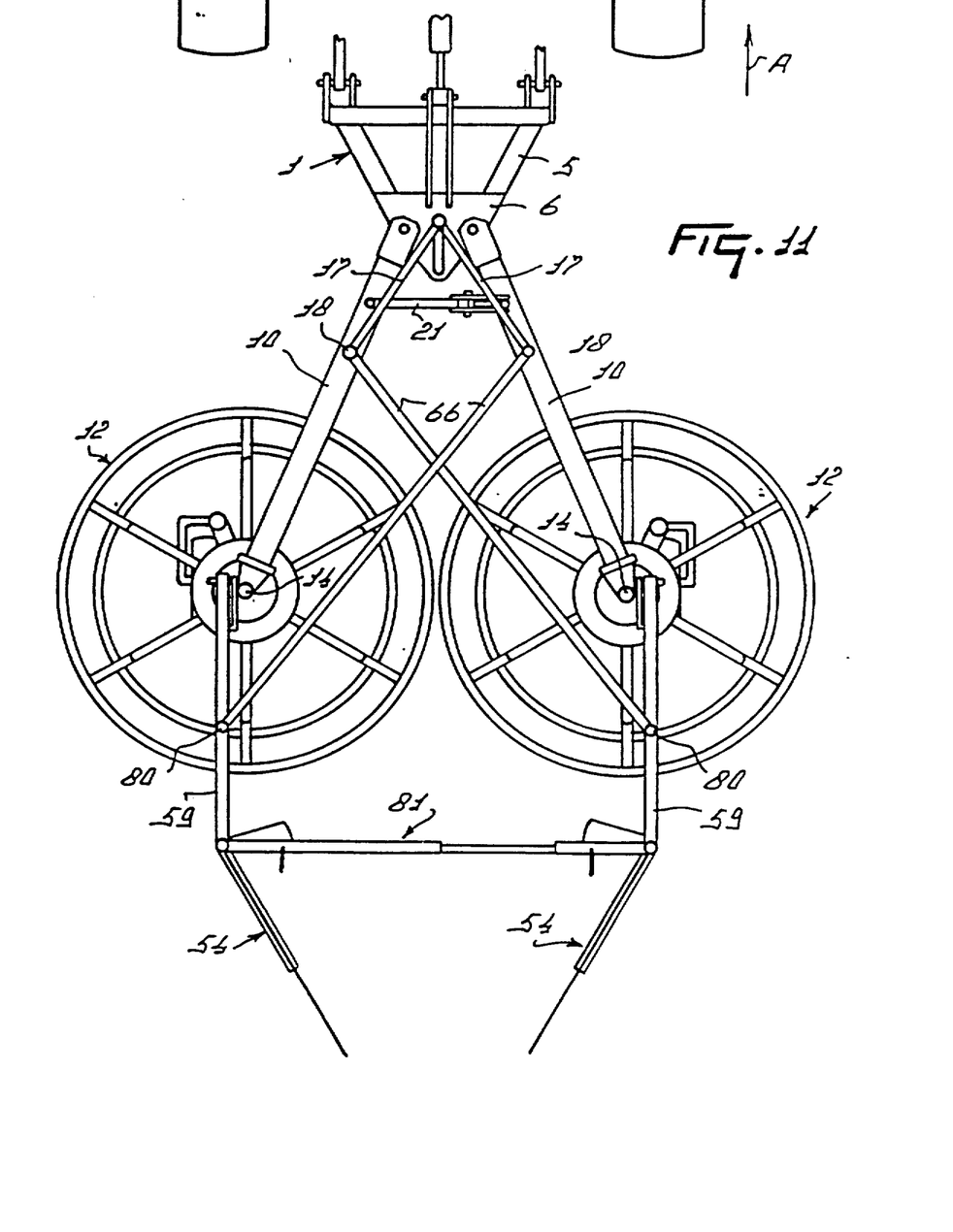
FIG. 11 is a plan view of the machine in a transport position.

If the person operating the machine wants to adjust the machine into a transport position, he raises the locking device 107 in upward direction by means of a cord 111 which is operable from the driver's seat. Then, the locking device 107 turns upwardly about the pivotal shaft 106. If subsequently the piston rod is retracted with stationary rake members, the rake members 11 and 12 can be brought at such a small distance relative to each other that the then upwardly directed tines (dotted position in FIG. 8) define the smallest possible width of the two rake members and, consequently, the smallest transport width (FIG. 11). In this position, the sleeve 110 is situated in the recess 108; the operating person then loosens the cord 111, so that the locking device 107 swivels downwardly, causing a fixation of the sleeve 110 (and consequently the cylinder 21) by the recess 108, thus reaching a safe transport position. In this position, the length of the cylinder-piston rod unit 21 cannot be changed erroneously. Therefore, in order to attain the transport position, the operating person must pull the cord 111 deliberately, so that by doing so his attention is drawn to the fact that first of all the rake members must be brought to a standstill. Consequently, the recess 108 corresponds to a position which is suitable for road transport at, in this embodiment, a total maximum width of three meters, while the recess 109 corresponds to the smallest interspace between the rake members 11 and 12 during operation. The transport position of the machine is shown in FIG. 11.

Further rake members can be added, in a symmetrical manner, to the two rake members shown in the drawing, which additional wheels are arranged at the exterior sides of the rake members shown and rotate in the same sense as the adjacent rake members shown. In this case, the distances between the two rake members lying on one side of the plane of symmetry may have a fixed value for combining spread crop into one great swath, whereby a very large working width can be achieved.

Having disclosed our invention, what we claim as new and to be secured by Letters Patent of the United States is:

1. A machine for working cut grass, hay or other crops on a field, comprising:
    at least two rake members;
    power means for rotating said rake members around an upwardly directed axis;
    at least two swath-forming guide members for crop, each said guide member associated with a corresponding one of said rake members, and
    a means for selectively changing the operating distance between said rake members while retaining the swath width-determining distance between said guide members approximately constant while the machine is moving over the field and working the crop.

2. A machine as claimed in claim 1, wherein each of said rake member is journalled on a respective said frame arm which is pivotally connected to a frame portion that is adapted to be coupled to a tractor, each said guide member being pivotally connected to said frame arm carrying the associated rake member, said means for selectively changing the operation distance further comprising at least two steering rods, each said steering rod being pivotally coupled to one said guide member, the other end of said steering rod means being coupled to said frame arm carrying the other said rake member.

3. A machine as claimed in claim 2 comprising means for adjusting the operative length of said steering rods.

4. A machine as claimed in claim 1 comprising means for selectively changing and fixing the distance between the said guide members.

5. A machine for working cut grass, hay or other crops on a field, comprising:
    at least two rake members;
    power means for rotating said rake members around an upwardly directed axis;
    means for selectively changing the operating distance between said rake members while the machine is moving over the field and working the crop;
    at least two swath-forming guide members for crop, each said guide member associated with a corresponding one of said rake members; and
    a steering device for said guide member by means of which, on change of the distance between said rake members, the distance between said guide member's most rearward point and the machine's longitudinal plane of symmetry remains substantially constant.

6. A machine as defined in claim 5, wherein during the machine's travel over a field, said guide member is pivotally connected at a carrier portion to said steering device which, on change of the distance between said rake members, preserves the machine's symmetry relative to said plane of symmetry, said guide member further comprising said carrier portion and a pivotal swath portion.

7. A machine as claimed in claim 6, further comprising means for adjusting and fixing the angle between each said swath board and said plane of symmetry and a connection beam attached at each end to one of said means.

8. A machine as claimed in claim 7, wherein said connection beam is directed approximately perpendicularly relative to said plane of symmetry.

9. A machine for working cut grass, hay or other crops on a field, comprising:
    a frame portion;
    at least two frame arms pivotally connected to said frame portion;
    at least one rake member attached to each said frame arm at an end opposite from said frame arm's pivotal connection to said frame portion;
    a lower means for rotation said rake members around an upwardly directed axis;
    at least two guide members, each said guide member attached to said rake member which is innermost of said rake members attached to said frame arm and capable of limited pivotally free movement in a vertical direction and adjustable pivotal movement in a horizontal direction, each said guide member further comprising a carrier portion, an adjusting plate attached to the top of said carrier portion, a swath board pivotally mounted to said carrier portion such that it is pivotal in a vertical plane, and a pivot adjustment means for fixing the position of said swath board with respect to said carrier portion;

an adjustment means for symmetrically adjusting said frame arms and said rake members about a plane of symmetry passing through the middle of said frame portion parallel to the machine's direction of travel while the machine is being pulled by a tractor across a field, said adjustment means comprising a double-acting hydraulic cylinder and piston rod activating device wherein said cylinder is pivotally attached to one said frame arm and said piston rod is pivotally attached to a second said frame arm, at least two steering rods, each of which is pivotally attached at one end to one said frame arm and pivotally attached at the opposite end to said carrier portion of said guide member attached to one said rake member which is, in turn, attached to an opposite said second frame arm, at least two rods pivotally attached at one end to said frame portion by means of a pin at the opposite end to one of said frame arms and a slot, lying in said plane of symmetry, in said frame portion such that said pin is movable in said slot;

a control means for activating said adjustment means from the driver's seat of the tractor on which the machine is mounted; and a horizontal member for maintaining the symmetrical relationship of opposing said carrier portions around said plane of symmetry.

10. A machine for working cut grass, hay or other crops on a field, comprising:

a frame portion;

at least two frame arms pivotally connected to said frame portion;

at least one rake member attached to each said frame arm at an end opposite from said frame arm's pivotal connection to said frame portion;

a power means for rotating said rake members around an upwardly directed axis;

at least two guide members, each said guide member attached to said rake member which is innermost of said rake members attached to said frame arm and capable of limited pivotally free movement in a vertical direction and adjustable pivotal movement in a horizontal direction, each said guide member further comprising a carrier portion and a swath board comprising a pipe attached at its upper end to said carrier portion, said pipe descending in a rearward direction with an opposite end bent to lie on the ground, and tines attached to and freely extending rearwardly from the descending portion of said pipe;

an adjustment means for symmetrically adjusting said frame arms and said rake members about a plane of symmetry passing through the middle of said frame portion parallel to the machine's direction of travel while the machine is being pulled by a tractor across a field, said adjustment means comprising a double-acting hydraulic cylinder and piston rod activating device wherein said cylinder is pivotally attached to one said frame arm and said piston rod is pivotally attached to a second said frame arm; at least two steering rods, each of which is pivotally attached at one end to one said frame arm and pivotally attached at the opposite end to a carrier portion of said guide member attached to one said rake member which is, in turn, attached to an opposite said second frame arm; at least two rods pivotally attached at one end to said frame portion by means of a pin and at the opposite end to one of said frame areas; and a slot, lying in said plane of symmetry, in said frame portion such that said pin is movable in said slot;

a control means for activating the adjustment means from the driver's seat of the tractor on which the machine is mounted; wherein when said adjustment means is activated, opposing said frame arms, said rake members, and said guide members move in equal and opposite directions such that symmetry is maintained about said plane of symmetry and nearly constant lateral distance is maintained between the free ends of said tines of opposing said guide members.

* * * * *

UNITED STATES PATENT AND TRADEMARK OFFICE
CERTIFICATE OF CORRECTION

PATENT NO. : 4,776,157

DATED : October 11, 1988

INVENTOR(S) : ARY VAN DER LELY and CORNELIS J. G. BOM

It is certified that error appears in the above-identified patent and that said Letters Patent is hereby corrected as shown below:

Cover Page, Delete "[73] Assignee: C. van der Lely, N.V., Naasland, Netherlands"

and insert therefor --[73] Assignee: C. van der Lely, N.V., Maasland, Netherlands--

Signed and Sealed this

Fourth Day of April, 1989

Attest:

DONALD J. QUIGG

Attesting Officer

Commissioner of Patents and Trademarks

UNITED STATES PATENT AND TRADEMARK OFFICE
CERTIFICATE OF CORRECTION

PATENT NO. : 4,776,157
DATED : October 11, 1988
INVENTOR(S) : Ary van der Lely and Cornelis J.G. Bom It is certified that error appears in the above-identified patent and that said Letters Patent is hereby corrected as shown below:

Claim 9, line 9, delete "a lower means for rotation"

and insert therefor --a power means for rotating--

Signed and Sealed this

Eleventh Day of July, 1989

Attest:

DONALD J. QUIGG

Attesting Officer

Commissioner of Patents and Trademarks

Disclaimer 4,776,157.—*Ary van der Lely*, Maasland; *Cornelis J. G. Bom*, Rozenburg, both of theNetherlands. MACHINE FOR WORKING GRASS, HAY OR OTHER CROPS ON THE FIELD. Patent dated Oct. 11, 1988. Disclaimer filed Aug. 18, 1989, by the assignee, C. van der Lely, N. V.

Hereby enters this disclaimer to claims 6, 7, and 8 of said patent.
[*Official Gazette November 21, 1989*]

UNITED STATES PATENT AND TRADEMARK OFFICE
CERTIFICATE OF CORRECTION

PATENT NO. : 4,776,157

DATED : October 11, 1988

INVENTOR(S) : Ary van der Lely and Cornelis J.G. Bom

It is certified that error appears in the above-identified patent and that said Letters Patent is hereby corrected as shown below:

Insert between page 4, "Sheet 3 of 3" of the drawings, and page 5, first page of the specification containing columns 1 and 2, the attached three sheets of drawings containing Figures 7 through 11 in sequence whereby Figure 7 is on the first inserted sheet and Figure 11 is on the last inserted sheet.

Amend the heading lines of pages 2, 3 and 4 as follows:

Page 2, containing Figure 1, change "Sheet 1 of 3" to --Sheet 1 of 6--.
Page 3, containing Figures 2, 4, 5 and 6, change "Sheet 2 of 3" to --Sheet 2 of 6--.
Page 4, containing Figure 3, change "Sheet 3 of 3" to --Sheet 3 of 6--.

Amend the inserted sheets of drawings by providing each the following respective captions:

Sheet containing Figure 7: --U.S. Patent   October 11, 1988   Sheet 4 of 6   4,776,157--

Sheet containing Figures 8, 9 and 10: --U.S. Patent   October 11, 1988   Sheet 5 of 6   4,776,157--

UNITED STATES PATENT AND TRADEMARK OFFICE
CERTIFICATE OF CORRECTION

Page 2 of 5

PATENT NO. : 4,776,157

DATED : October 11, 1988

INVENTOR(S) : Ary van der Lely and Cornelis J.G. Bom

It is certified that error appears in the above-identified patent and that said Letters Patent is hereby corrected as shown below:

Sheet containing Figure 11:   --U.S. Patent
October 11, 1988   Sheet 6 of 6   4,776,157--.

Signed and Sealed this

Thirteenth Day of February, 1990

Attest:

JEFFREY M. SAMUELS

*Attesting Officer*     *Acting Commissioner of Patents and Trademarks*